US012658754B2

(12) United States Patent
Uetani et al.

(10) Patent No.: US 12,658,754 B2
(45) Date of Patent: Jun. 16, 2026

(54) STATOR AND MOTOR

(71) Applicant: NIDEC CORPORATION, Kyoto (JP)

(72) Inventors: Takahiro Uetani, Kyoto (JP); Rinto Inoue, Kyoto (JP); Shogo Takayama, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 1116 days.

(21) Appl. No.: 17/705,394

(22) Filed: Mar. 28, 2022

(65) Prior Publication Data

US 2022/0311299 A1 Sep. 29, 2022

(30) Foreign Application Priority Data

Mar. 29, 2021 (JP) ................................. 2021-054542

(51) Int. Cl.
*H02K 3/28* (2006.01)
*H02K 21/14* (2006.01)

(52) U.S. Cl.
CPC .............. *H02K 3/28* (2013.01); *H02K 21/14* (2013.01)

(58) Field of Classification Search
CPC ................................. H02K 3/28; H02K 21/14
See application file for complete search history.

(56) References Cited

U.S. PATENT DOCUMENTS

| 6,841,913 | B2 | 1/2005 | Gorohara et al. |
| 8,193,675 | B2 | 6/2012 | Ishizuka et al. |
| 8,344,575 | B2 | 1/2013 | Koga et al. |
| 9,214,847 | B2 | 12/2015 | Manabu et al. |
| 9,455,605 | B2 | 9/2016 | Saito et al. |
| 9,479,020 | B2 | 10/2016 | Hisada |
| 2002/0005698 | A1* | 1/2002 | Asao ...................... H02K 11/05 318/140 |
| 2004/0007931 | A1* | 1/2004 | Gorohata ................. H02K 3/12 310/201 |
| 2010/0289374 | A1* | 11/2010 | Koga ................... H02K 15/064 310/195 |

FOREIGN PATENT DOCUMENTS

| JP | 2020114116 A | 7/2020 |
| KR | 101803879 B1 | 12/2017 |

OTHER PUBLICATIONS

Uetani et al.; "Stator and Motor", U.S. Appl. No. 17/705,395, filed Mar. 28, 2022. 63pp.

* cited by examiner

*Primary Examiner* — Tulsidas C Patel
*Assistant Examiner* — Robert E Mates
(74) *Attorney, Agent, or Firm* — HAUPTMAN HAM, LLP

(57) ABSTRACT

One aspect of a stator of the present invention is a stator disposed radially outside a rotor rotatable about a center axis line. The stator includes a winding portion including a plurality of conductor connection bodies in which a plurality of conductors are connected in series and a stator core in which a plurality of slots through which the conductor connection body passes are provided. The conductor connection body includes a first portion wave-wound on the other side in a circumferential direction, a folded portion connected to an end on the other side in the circumferential direction of the first portion, and a second portion wave-wound on one side in the circumferential direction from the folded portion. The folded portion is located on one side in an axial direction of the stator core and bent radially inside. At least a part of the folded portion is located radially inside from an inside surface of the stator core.

14 Claims, 11 Drawing Sheets

STATOR AND MOTOR

CROSS-REFERENCE TO RELATED APPLICATIONS

The present invention claims priority under 35 U.S.C. § 119 to Japanese Patent Application No. 2021-054542 filed on Mar. 29, 2021, the entire content of which is incorporated herein by reference.

FIELD OF THE INVENTION

The present invention relates to a stator and a motor.

BACKGROUND

In a motor for an electric vehicle, distributed winding is adopted for the purpose of reducing vibration and noise. There is a wave-wound stator using a plurality of segment coils for the purpose of improving efficiency of the motor.

A long arrangement path of a conductor cannot be secured when wave winding of a conventional structure is performed. On the other hand, a folded portion is provided in the arrangement path of the wave-wound conductor, and the conductor is wave-wound in an opposite direction with the folded portion interposed therebetween, thereby lengthening the arrangement path of the conductor. However, a segment coil is non-circular and is significantly less flexible than a conductor using a general round wire. That is, because a shape of the folded portion is significantly different from that of the segment coil other than the folded portion, the segment coil of the folded portion has a large axial dimension in order to avoid other segment coils. Consequently, there is a problem in that the axial dimension of the stator is increased.

SUMMARY

One aspect of the stator the present invention is a stator disposed radially outside a rotor rotatable about a center axis line. The stator includes a winding portion including a plurality of conductor connection bodies in which a plurality of conductors are connected in series and a stator core in which a plurality of slots through which the conductor connection body passes are provided. The conductor connection body includes a first portion wave-wound on the other side in a circumferential direction, a folded portion connected to an end on the other side in the circumferential direction of the first portion, and a second portion wave-wound on one side in the circumferential direction from the folded portion. The folded portion is located on one side in an axial direction of the stator core and bent radially inside. At least a part of the folded portion is located radially inside from an inside surface of the stator core.

The above and other elements, features, steps, characteristics and advantages of the present disclosure will become more apparent from the following detailed description of the preferred embodiments with reference to the attached drawings.

DETAILED DESCRIPTION

A Z-axis direction appropriately illustrated in each drawing is a vertical direction in which a positive side is an "upper side" and a negative side is a "lower side". A center axis line J appropriately illustrated in each drawing is a virtual line that is parallel to the Z-axis direction and extends in the vertical direction. In the following description, an axial direction of the center axis line J, namely, the direction parallel to the vertical direction is simply referred to as an "axial direction", the upper side is referred to as a "one side in the axial direction", and the lower side is referred to as "the other side in the axial direction". Sometimes a radial direction about the center axis line J is simply referred to as a "radial direction". Furthermore, sometimes the circumferential direction centered on the center axis line J is simply referred to as the "circumferential direction", a clockwise direction when viewed from above is referred to as "one side in the circumferential direction", and a counterclockwise direction when viewed from above is referred to as "the other side in the circumferential direction".

The vertical direction, the upper side, and the lower side are merely names for describing an arrangement relationship between respective units, and an actual arrangement relationship and the like may be other than the arrangement relationship indicated by these names. Furthermore, the directions described as one side in the axial direction and the other side in the axial direction can reproduce an effect of the embodiment even when they are replaced with each other. Similarly, the directions described as one side in the circumferential direction $\theta 1$ and the other side in the circumferential direction $\theta 2$ can reproduce the effect of the embodiment even when they are replaced with each other.

Figure 1:
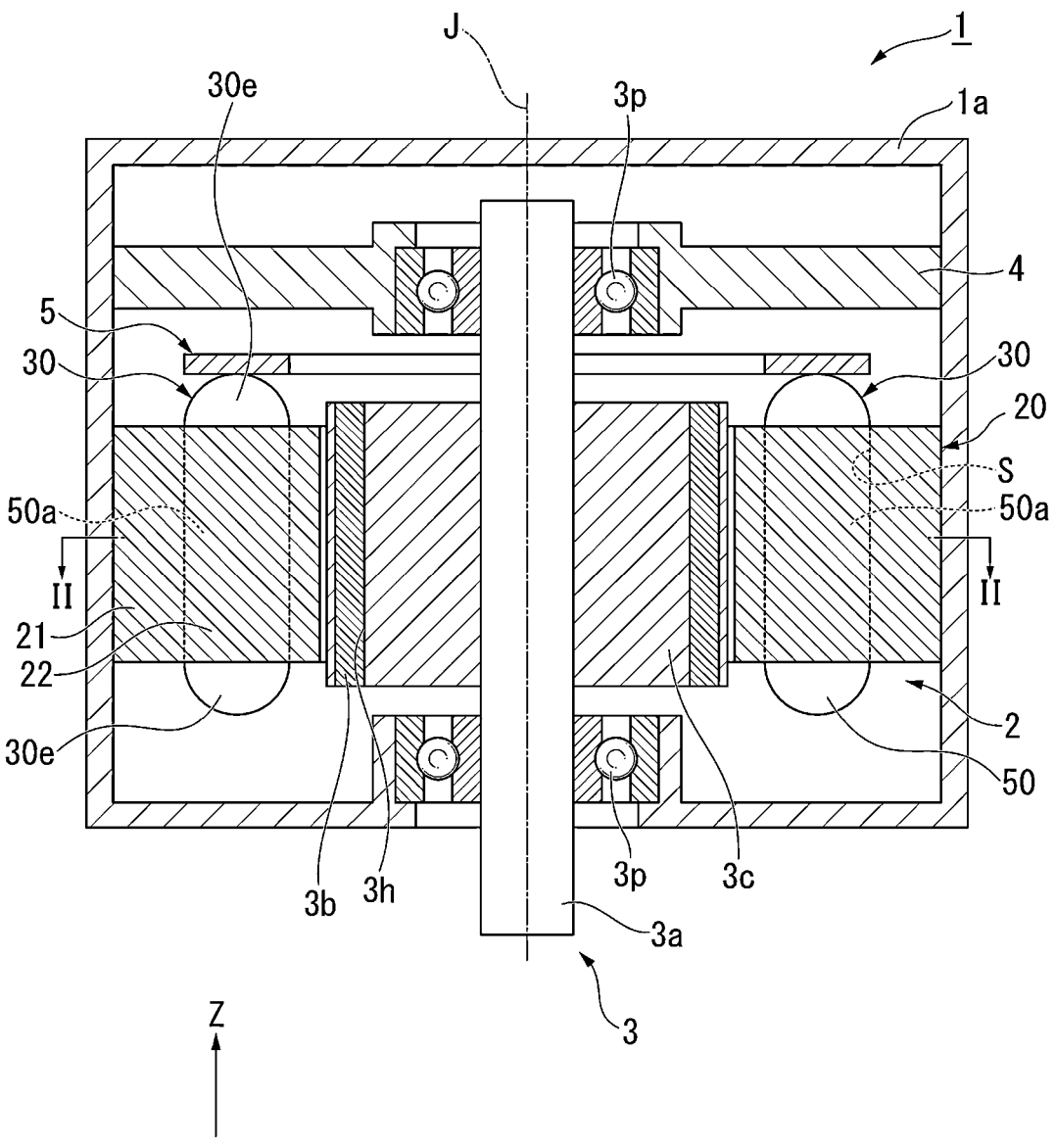
FIG. 1 is a schematic sectional view illustrating a motor according to an embodiment.

FIG. 1 is a schematic sectional view illustrating a motor 1 according to an embodiment.

As illustrated in FIG. 1, the motor 1 of the embodiment is an inner rotor type motor. Furthermore, the motor 1 of the embodiment is a three-phase AC motor. The center of the motor 1 is the center axis line J.

The motor 1 includes a rotor 3, a stator 2, a bus bar unit 5, a bearing holder 4, and a housing 1a accommodating them. The bus bar unit 5 is arranged above the stator 2. The bus bar unit 5 is connected to the stator 2.

The rotor 3 is rotatable about the center axis line J. The rotor 3 is arranged on the radially inside of the annular stator 2. That is, the rotor 3 is opposed to the stator 2 in the radial direction. The rotor 3 includes a shaft 3*a*, a rotor magnet 3*b*, and a rotor core 3*c*.

The shaft 3*a* extends in an axial direction along a center axis line J. The shaft 3*a* has a columnar shape centered on the center axis line J and extending in the axial direction. The shaft 3*a* is supported by two bearings 3*p* so as to be rotatable about the center axis line J.

Figure 2:
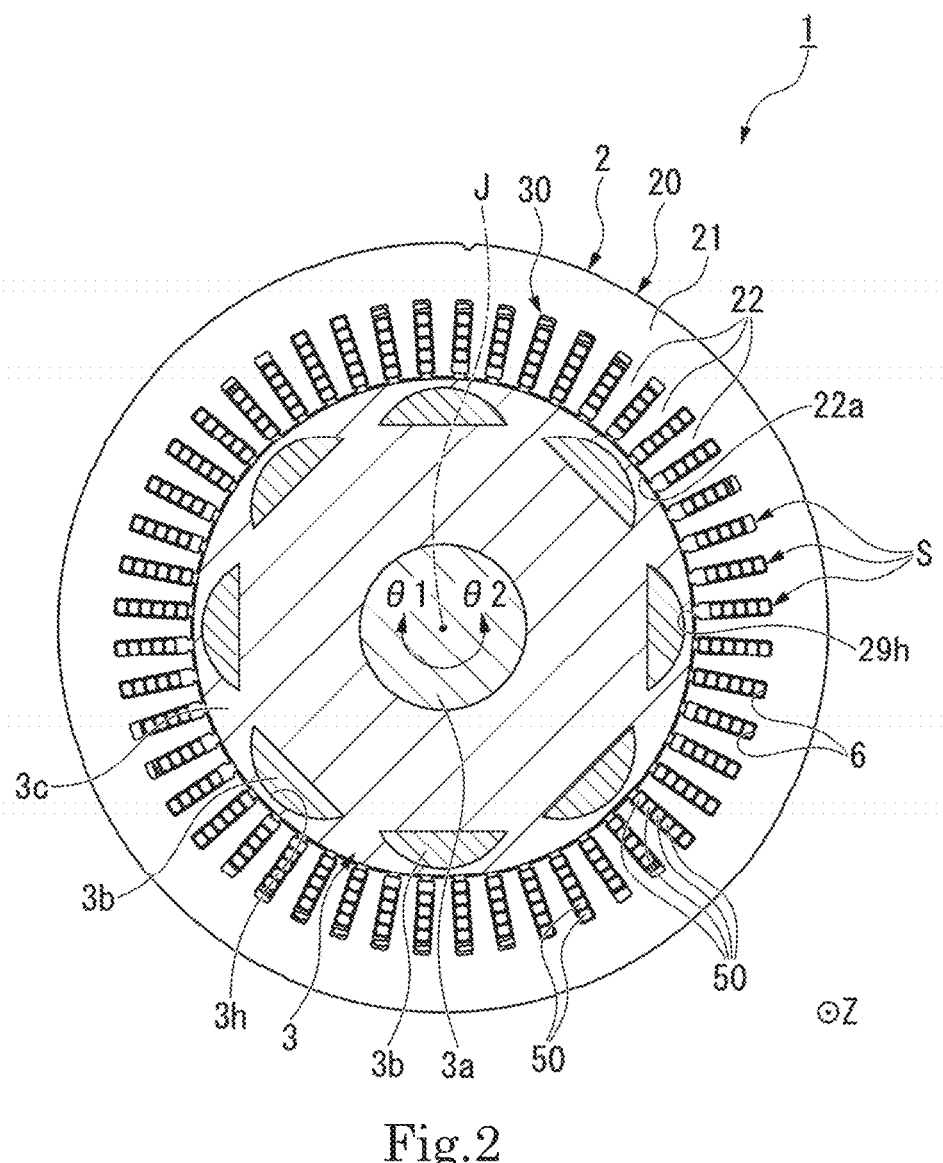
FIG. 2 is a sectional view illustrating the motor taken along a line II-II of FIG. 1.

FIG. 2 is a sectional view illustrating the motor 1 taken along a line II-II of FIG. 1.

The rotor core 3*c* is configured by stacking magnetic steel sheets. The rotor core 3*c* has a cylindrical shape extending in the axial direction. An inner peripheral surface of the rotor core 3*c* is fixed to an outer peripheral surface of the shaft 3*a*. A holding hole 3*h* into which the rotor magnet 3*b* is inserted and fixed is made in the rotor core 3*c*.

The rotor magnet 3*b* is opposed to the stator 2 in the radial direction. The rotor magnet 3*b* is held while embedded in the rotor core 3*c*. The rotor magnet 3*b* of the embodiment has eight poles. A number of poles of the rotor 3 is not limited to the embodiment. Furthermore, the rotor magnet 3*b* may be a magnet of another form such as an annular ring magnet.

The stator 2 is arranged to the rotor 3 in the radial direction with a gap interposed therebetween. In the embodiment, the stator 2 is arranged on the radially outside of the rotor 3. The stator 2 includes a stator core 20, a winding portion 30, and a plurality of insulating papers 6.

The stator core 20 has the annular shape centered on the center axis line J. The stator core 20 consists of electromagnetic steel sheets stacked along the axial direction. The stator core 20 includes a core back 21 having an annular shape centered on the center axis line J and a plurality of teeth 22 extending radially inward from the core back 21.

The plurality of teeth 22 are arranged at regular intervals in the circumferential direction. An umbrella 22*a* is provided at a tip portion on the inside in the radial direction of the teeth 22. The umbrella 22*a* projects on both sides in the circumferential direction with respect to the teeth 22. That is, a dimension in the circumferential direction of the umbrella 22*a* is larger than a dimension in the circumferential direction of the teeth 22. The surface of the umbrella 22*a* facing inward in the radial direction is opposite to the outer peripheral surface of the rotor 3 in the radial direction with a gap interposed therebetween.

The winding portion 30 is mounted on the teeth 22. A slot S is provided between the teeth 22 adjacent to each other in the circumferential direction. That is, a plurality of slots S arranged in the circumferential direction are provided in the stator core 20.

A conductor 50 of the winding portion 30 is accommodated in the slot S. The insulating paper 6 is arranged one by one in the slot S. The insulating paper 6 secures insulation between the winding portion 30 and the stator core 20 in the slot S.

A plurality of layers arranged in the radial direction are provided in one slot S. In one slot, one conductor 50 is placed on each layer. In the slot S, a plurality of conductors 50 are arranged in a row along the radial direction.

The slot S includes an opening 29*h* that is open radially inward. The opening 29*h* is located between the umbrellas 22*a* located at the tips of the adjacent teeth 22. A width dimension along the circumferential direction of the opening 29*h* is smaller than the dimension along the circumferential direction of the conductor 50. For this reason, the conductor 50 is difficult to pass through the opening 29*h*, and the conductor 50 is prevented from being separated from the stator core 20.

In the embodiment, the stator core 20 has 48 teeth 22. That is, the stator 2 of the embodiment has 48 slots. The number of slots of the stator 2 is appropriately set according to the number of poles of the rotor magnet 3*b* and a method for winding the winding portion 30.

Figure 3:
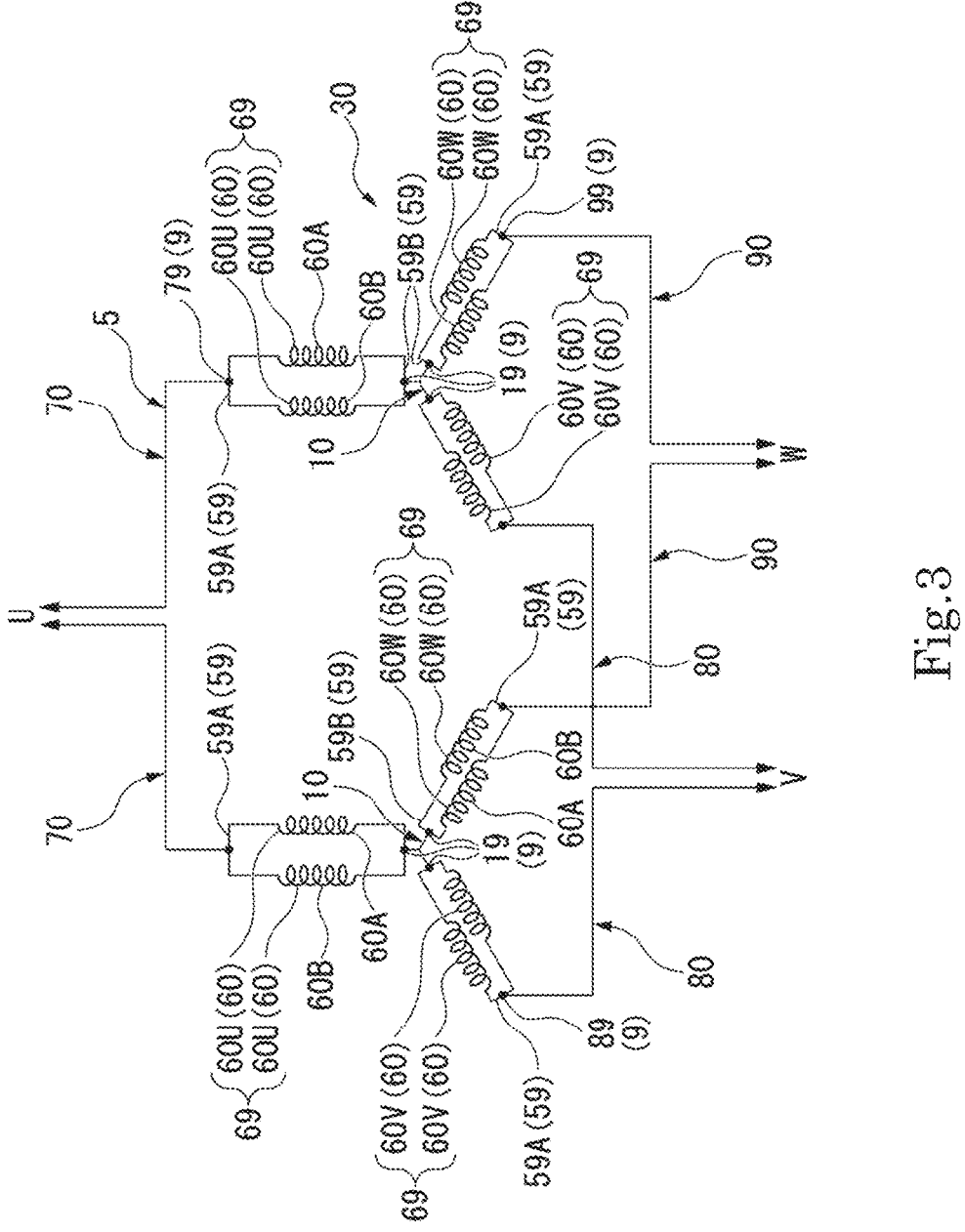
FIG. 3 is a schematic diagram illustrating a circuit configured by a winding portion and a bus bar unit of the embodiment.

FIG. 3 is a schematic diagram illustrating a circuit configured by the winding portion 30 and the bus bar unit 5 of the embodiment.

The winding portion 30 of the embodiment includes a plurality of (12 in the embodiment) conductor connection bodies 60 to configure a segment coil. The 12 conductor connection bodies 60 are classified into four U-phase conductor connection bodies 60U, four V-phase conductor connection bodies 60V, and four W-phase conductor connection bodies 60W.

Two of the four conductor connection bodies 60 having the same phase pass through the adjacent slots S and are mounted on the stator core 20. In the present specification, two conductor connection bodies 60 passing through the adjacent slots S are referred to as the connection body pair 69. Furthermore, in the following description, when two conductor connection bodies 60 forming the connection body pair 69 are distinguished from each other, one is referred to as a first conductor connection body 60A and the other is referred to as a second conductor connection body 60B.

Furthermore, although described in detail later, the bus bar unit 5 includes six phase bus bars (bus bars) 70, 80, 90 and two neutral point bus bars (bus bars) 10. The three phase bus bars 70, 80, 90 are classified into a U-phase bus bar 70, a V-phase bus bar 80, and a W-phase bus bar 90.

The U-phase conductor connection body 60U, the V-phase conductor connection body 60V, and the W-phase conductor connection body 60W are Y-connected by the neutral point bus bar 10 and the phase bus bars 70, 80, 90. In the embodiment, four Y-connections corresponding to the four conductor connection bodies 60 of each phase are configured, and the Y-connections are connected in parallel. That is, the plurality of conductor connection body 60 are 4Y-connected.

In the embodiment, the case where the winding portion 30 includes four conductor connection bodies 60 having the same phase has been described. However, when the winding portion 30 includes at least two conductor connection bodies 60, and when these conductor connection bodies 60 configure a connection body pair 69 passing through the adjacent slots S in the circumferential direction, the winding configuration similar to that of the embodiment can be obtained. Accordingly, the plurality of conductor connection bodies 60 need only have Y-connections of 2×M with M as a natural number (M=2 in the embodiment).

The two conductor connection bodies 60 configuring the connection body pair 69 are connected in parallel at a first bent portion 59A and a second bent portion 59B. That is, each of the plurality of phases includes the plurality of conductor connection bodies 60, and the conductor connection bodies 60 of each phase are connected in parallel to each other.

The first bent portion 59A and the second bent portion 59B are provided at one end and the other end of the conductor connection body 60, respectively. Between the first bent portion 59A and the second bent portion 59B, the conductor connection body 60 is mounted on the stator core 20 to form a coil for each phase. The conductor connection body 60 is connected to the bus bar unit 5 at the first bent portion 59A and the second bent portion 59B.

The second bent portion 59B of each of the two U-phase conductor connection bodies 60U, the two V-phase conductor connection bodies 60V, and the two W-phase conductor connection bodies 60W is connected to one neutral point bus bars 10 through each the second bent portion 59B. Thus, the second bent portions 59B of the six conductor connection bodies 60 become the same potential and configure the neutral point. Two neutral point bus bars 10 are provided in the bus bar unit 5. Each of the two neutral point bus bars 10 configures the neutral point of the three-phase circuit.

The two U-phase conductor connection bodies 60U are connected to one U-phase bus bar 70 through the first bent portion 59A. The two V-phase conductor connection bodies 60V are connected to one V-phase bus bar 80 through the first bent portion 59A. The two W-phase conductor connection bodies 60W are connected to one W-phase bus bar 90 through the first bent portion 59A. Alternating currents in which the phases are shifted by 120° from one another are passed through the U-phase bus bar 70, the V-phase bus bar 80, and the W-phase bus bar 90. In addition, the phases of the currents flowing through the two in-phase bus bars 70, 80, 90 are matched with one another.

Figure 4:
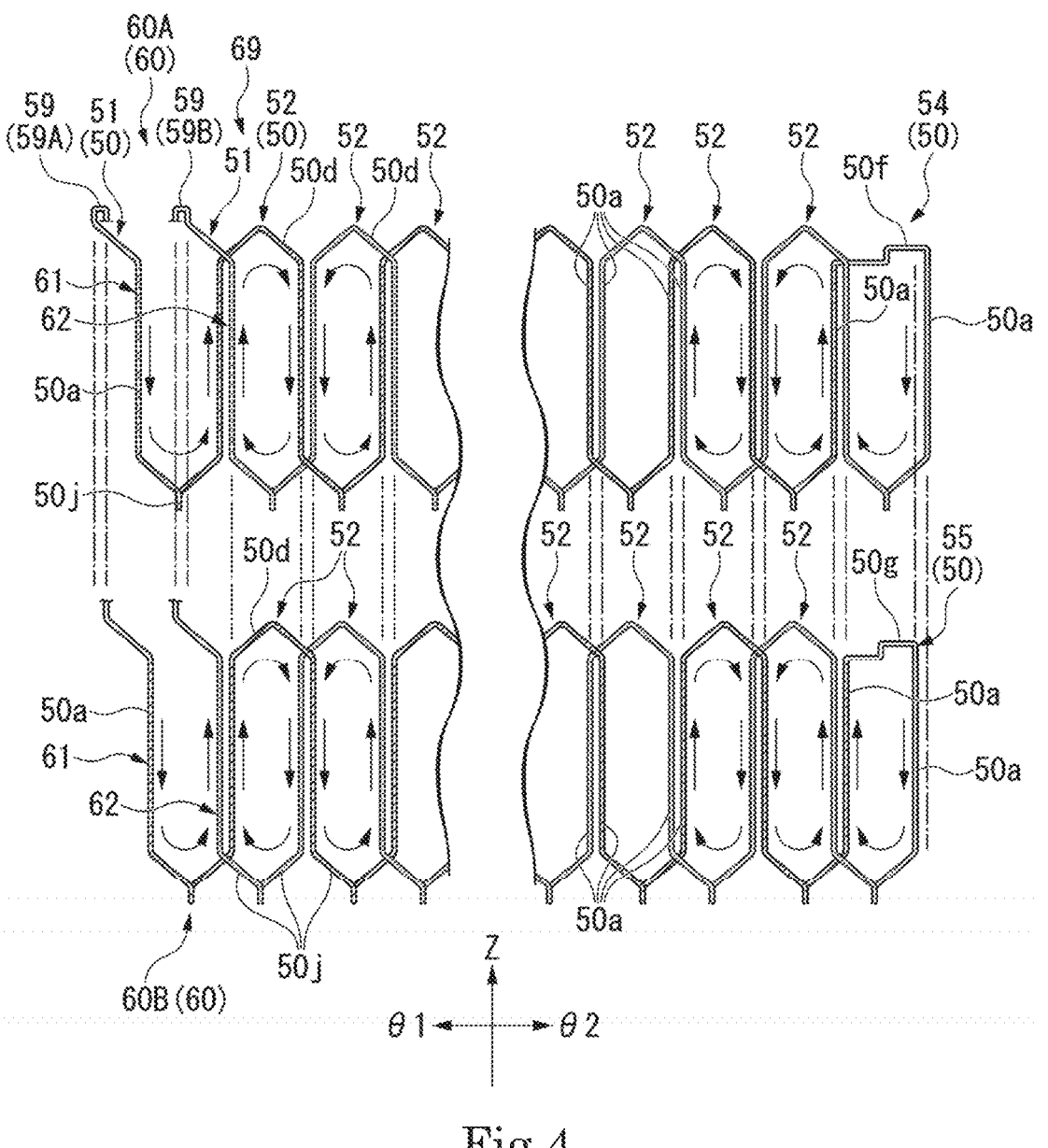
FIG. 4 is a schematic diagram illustrating a winding configuration of a conductor connection body of the embodiment.

FIG. 4 is a schematic diagram illustrating a winding configuration of two conductor connection bodies 60 forming the connection body pair 69.

As illustrated in FIG. 4, the conductor connection body 60 is configured by connecting the plurality of conductors 50 in series. Each conductor 50 is configured by bending a flat wire. Accordingly, a space factor of the conductor 50 in the slot S can be improved as compared with the case of using a round wire. In the present specification, the "flat wire" is a wire rod having a quadrangular sectional shape or a substantially quadrangular sectional shape. In the present specification, the term "substantially square shape" includes a square shape with rounded corners. Although not illustrated, the conductor 50 in the embodiment has an enamel coating on the surface.

The plurality of conductors 50 configuring the conductor connection body 60 are classified into a terminal conductor 51, a hairpin conductor 52, a first folded conductor 54, and a second folded conductor 55.

Each of the various conductors 50 includes at least a straight portion 50a extending linearly along the axial direction (Z-direction) and a connection portion 50j located at the lower end of the lower side (the other side in the axial direction). The straight portion 50a passes through the slot S. That is, the conductor connection body 60 is accommodated in the slot S in the straight portion 50a. The conductor connection body 60 extends to the upper side and the lower side of the stator core 20 in a region other than the straight portion 50a. The portions extending from the upper side and the lower side of the stator core 20 configure a coil end 30e (see FIG. 1) of the stator core 20.

A connection portion 50j is connected to a connection portion 50j of another conductor 50. The connection portions 50j of the pair of conductors 50 are joined to each other by joining means such as welding. The connection portion 50j is bent in the circumferential direction after the conductor 50 is mounted on the stator core 20, and the connection portion 50j is welded to the connection portion 50j of another conductor 50. In the conductor 50 before mounting on the stator core 20, the connection portion 50j has a straight shape continuous to the straight portion 50a. The conductor 50 is attached to the stator core 20 by inserting the connection portion 50j and the straight portion 50a into the slot S from the upper side (one side in the axial direction) of the stator core 20. The connection portion 50j is bent in the circumferential direction and welded to another connection portion 50j, so that the conductor 50 is prevented from being axially detached from the stator core 20.

The plurality of conductors 50 are inserted into the slot S of the stator core 20 from the upper side and joined on the lower side, so that the stator 2 of the embodiment can be assembled. Consequently, a complicated assembly process is not required, but an assembly process can be simplified.

Various conductors 50 will be described below.

In the plurality of conductors 50, the terminal conductor 51 is connected to the bus bars 10, 70, 80, 90 to function as a terminal. The terminal conductor 51 is provided so as to straddle two conductor connection bodies 60 (first conductor connection body 60A and second conductor connection body 60B) that are in phase and pass through slots S adjacent to each other in the circumferential direction. The terminal conductor 51 includes one bent portion 59, two straight portions 50a, and two connection portions 50j.

The specific shape of the bent portion 59 of the terminal conductor 51 will be described in detail later with reference to FIG. 8 and the like. An overall structure of the terminal conductor 51 will be mainly described below.

The bent portion 59 is disposed at the upper end of the terminal conductor 51. The bent portion 59 protrudes upward from an upper end face of the stator core 20. The bent portion 59 connects the upper ends of the two straight portions 50a to each other. That is, the bent portion 59 connects the ends of the two straight portions 50a on the upper side of the stator core 20.

In the two straight portions 50a connected to the bent portion 59, one is the straight portion 50a of the first conductor connection body 60A and the other is the straight portion 50a of the second conductor connection body 60B. That is, the first conductor connection body 60A and the second conductor connection body 60B are connected to each other through the bent portion 59. As illustrated in FIG. 3, the coil formed by the first conductor connection body 60A and the coil formed by the second conductor connection body 60B are connected in parallel by the bent portion 59.

In the terminal conductor 51, the two straight portions 50a pass through the slots S adjacent to each other in the circumferential direction. Furthermore, the two connection portions 50j are connected to the lower ends of different straight portions 50a. The plurality of crossing portions 50d project from the upper end surface (one side in the axial direction) of the stator core 20. In the terminal conductor 51, the two connection portions 50j are bent in the same direction (the other side θ2 in the circumferential direction) in the circumferential direction.

As illustrated in FIG. 3, the bent portion 59 is connected to any one of terminal portions 19, 79, 89, 99 of the neutral point bus bars 10 and the phase bus bars 70, 80, 90. As illustrated in FIG. 4, two bent portions 59 are provided in the conductor connection body 60. In the following description, in the two bent portions 59, one located on one side in the circumferential direction is referred to as the first bent portion 59A, and the other located on the other side in the circumferential direction is referred to as the second bent portion 59B. The first bent portion 59A connects one end of the first conductor connection body 60A and one end of the second conductor connection body 60B. Similarly, the second bent portion 59B connects the other end of the first conductor connection body 60A and the other end of the second conductor connection body 60B.

The hairpin conductor 52 includes two straight portions 50a, two connection portions 50j, and one crossing portion 50d. The crossing portion 50d is arranged at the upper end portion of the hairpin conductor 52. The crossing portion 50*d* connects two straight portions 50*a* to each other. That is, in the hairpin conductor 52, two straight portions 50*a* are connected to each other through the crossing portion 50*d*. In the hairpin conductor 52, two connection portions 50*j* are connected to the lower ends of different straight portions 50*a*. The plurality of crossing portions 50*d* project from the upper end surface (one side in the axial direction) of the stator core 20. That is, some of the plurality of conductors 50 include the crossing portion 50*d* connecting the slots S on the upper side of the stator core 20.

In the hairpin conductor 52, two straight portions 50*a* are lined up with the number of slots per pole s. At this point, the number of slots per pole s means the number of slots S of the stator 2 arranged between magnetic poles of the rotor 3 in the combination of the rotor 3 and the stator 2. The number of slots per pole s is calculated by (the total number of slots in the stator 2)/(the number of magnetic poles in the rotor 3). In the embodiment, the number of magnetic poles of the rotor 3 is 8, and the number of slots of the stator 2 is 48, so that the number of slots per pole s is 6. In the hairpin conductor 52, the two straight portions 50*a* are separated from each other by six slots in the circumferential direction.

In the hairpin conductor 52, two connection portions 50*j* are bent in opposite directions in the circumferential direction. In two connection portions 50*j*, one located on one side θ1 in the circumferential direction extends from the lower end of the straight portion 50*a* to the other side θ2 in the circumferential direction, and the other located on the other side θ2 in the circumferential direction extends from the lower end of the straight portion 50*a* to one side θ1 in the circumferential direction.

The first folded conductor 54 includes two straight portions 50*a*, two connection portions 50*j*, and one first folded portion (folded portion) 50*f*. Similarly, the second folded conductor 55 includes two straight portions 50*a*, two connection portions 50*j*, and one second folded portion (folded portion) 50*g*. The first folded portion 50*f* and the second folded portion 50*g* are arranged at the upper end portion of the first folded conductor 54 or the second folded conductor 55.

The first folded portion 50*f* and the second folded portion 50*g* connect the two straight portions 50*a* to each other. That is, in the first folded conductor 54 and the second folded conductor 55, the two straight portions 50*a* are connected to each other through the first folded portion 50*f* or the second folded portion 50*g*.

The specific shapes of the folded portions 50*f*, 50*g* will be described in detail in later based on FIG. 7 and the like.

In the first folded conductor 54 and the second folded conductor 55, two connection portions 50*j* are bent in one side θ1 in the circumferential direction. That is, in the first folded conductor 54 and the second folded conductor 55, the two connection portions 50*j* extend from the lower end of the straight portion 50*a* to one side θ1 in the circumferential direction.

In the first folded conductor 54 and the second folded conductor 55, distances between the two straight portions 50*a* are different from each other. In the first folded conductor 54, the two straight portions 50*a* are arranged in the circumferential direction with the number of slots per pole s+1 (7 slots in the embodiment). On the other hand, in the second folded conductor 55, the two straight portions 50*a* are arranged in the circumferential direction with the number of slots per pole s−1 (5 slots in the embodiment). For this reason, the first folded portion 50*f* has a larger crossing amount in the circumferential direction by two slots than the second folded portion 50*g*. One first folded conductor 54 is provided in the first conductor connection body 60A. On the other hand, one second folded conductor 55 is provided in the second conductor connection body 60B.

Winding configurations of the first conductor connection body 60A and the second conductor connection body 60B will be described below.

In the first conductor connection body 60A, the two terminal conductors 51 are disposed at both ends of the first conductor connection body 60A, and the first folded conductor 54 is disposed substantially in the middle. The first conductor connection body 60A is wave-wound every 6 slots toward the other side θ2 in the circumferential direction from the first bent portion 59A to the first folded portion 50*f*. Furthermore, the first conductor connection body 60A is wave-wound every 6 slots toward one side θ1 in the circumferential direction from the first folded portion 50*f* to the second bent portion 59B.

At this point, in the first conductor connection body 60A, the region that is wave-wound toward the other side θ2 in the circumferential direction between the first bent portion 59A and the first folded portion 50*f* is referred to as the first portion 61. In the first conductor connection body 60A, the region that is wave-wound on one side θ1 in the circumferential direction between the first folded portion 50*f* and the second bent portion 59B is referred to as a second portion 62. That is, the first conductor connection body 60A includes the first bent portion 59A, the first portion 61 wave-wound from the first bent portion 59A to the other side θ2 in the circumferential direction, the first folded portion 50*f* connected to the end portion on the other end θ2 in the circumferential direction of the first portion 61, the second portion 62 wave-wound from the first folded portion 50*f* to one side θ1 in the circumferential direction, and the second bent portion 59B connected to the end portion of one side θ1 in the circumferential direction of the second portion 62.

In the second conductor connection body 60B, two terminal conductors 51 are arranged at the ends of both ends of the second conductor connection body 60B. The second conductor connection body 60B in which the second folded conductor 55 is arranged substantially in the middle is wave-wound every six slots toward the other side θ2 in the circumferential direction from the first bent portion 59A to the second folded portion 50*g* (first portion 61). Furthermore, the second conductor connection body 60B is wave-wound every six slots toward one side θ1 in the circumferential direction between (second portion 62) the second folded portion 50*g* and the second bent portion 59B That is, the second conductor connection body 60B includes the first bent portion 59A, the first portion 61 wave-wound from the first bent portion 59A to the other side θ2 in the circumferential direction, the second folded portion 50*g* connected to the end portion on the other end θ2 in the circumferential direction of the first portion 61, the second portion 62 wave-wound from the second folded portion 50*g* toward one side θ1 in the circumferential direction, and the second bent portion 59B connected to the end portion of one side θ1 in the circumferential direction of the second portion 62.

The conductor connection body 60 of the embodiment is wave-wound with the number of slots per pole s in the first portion 61 and the second portion 62. That is, the conductor connection body 60 is mounted on the stator core 20 by full pitch winding. For this reason, according to the embodiment, the plurality of conductors 50 arranged in the same slot S are all a part of the conductor connection body 60 having the same phase. Consequently, according to the embodiment, the conductor connection bodies 60 having different phases is not required to be insulated in one slot S, but the insulation is easy to secure.

In the embodiment, the winding portion 30 includes the first bent portion 59A, the second bent portion 59B, the crossing portion 50d, and the folded portions 50f, 50g. The first bent portion 59A, the second bent portion 59B, the crossing portion 50d, and the folded portions 50f, 50g configure the coil end 30e on the upper side of the stator core 20. On the other hand, the connection portion 50j configures the coil end 30e on the lower side of the stator core 20. The bent portion 59 is disposed on the outermost circumference of the coil end 30e. That is, the bent portion 59 is located on the radial outside of the plurality of crossing portions 50d. The first bent portion 59A extends upward (one side in the axial direction) from the stator core 20 and is connected to the phase bus bars 70, 80, 90. Similarly, the second bent portion 59B extends upward (one side in the axial direction) from the stator core 20 and is connected to the neutral point bus bar 10. According to the embodiment, the bent portion 59 can be disposed on the outermost circumference of the coil end 30e. As described later, this facilitates a connection process between the bent portion 59 and the bus bar unit 5.

According to the embodiment, the folded portions 50f, 50g are arranged on the innermost circumference of the coil end 30e. That is, the folded portions 50f, 50g are arranged on the radially inside of the plurality of crossing portions 50d. For this reason, the area radially inside the coil end 30e can be used as the arrangement area of the folded portions 50f, 50g, and the dimension in the vertical direction of the coil end 30e can be reduced.

Furthermore, according to the embodiment, the folded portions 50f, 50g are located on the innermost circumference of the coil end 30e, so that the bent portion 59 can be located on the outermost circumference of the coil end 30e. That is, according to the embodiment, the bent portion 59 extends from the outermost layer. Accordingly, the connecting process between the phase bus bars 70, 80, 90 and the first bent portion 59A and the connecting process between the neutral point bus bar 10 and the second bent portion 59B can be performed from the radial direction with respect to the coil end 30e, and a manufacturing process of the motor 1 can be simplified.

The first folded portion 50f and the second folded portion 50g of the embodiment will be described in detail below.

As described above, in the first conductor connection body 60A, the wave-wound direction is folded from the other side θ2 in the circumferential direction to one side θ1 in the circumferential direction at the first folded portion 50f. Similarly, in the second conductor connection body 60B, the wave-wound direction is folded back from the other side θ2 in the circumferential direction to one side θ1 in the circumferential direction at the second folded portion 50g.

Figure 11:
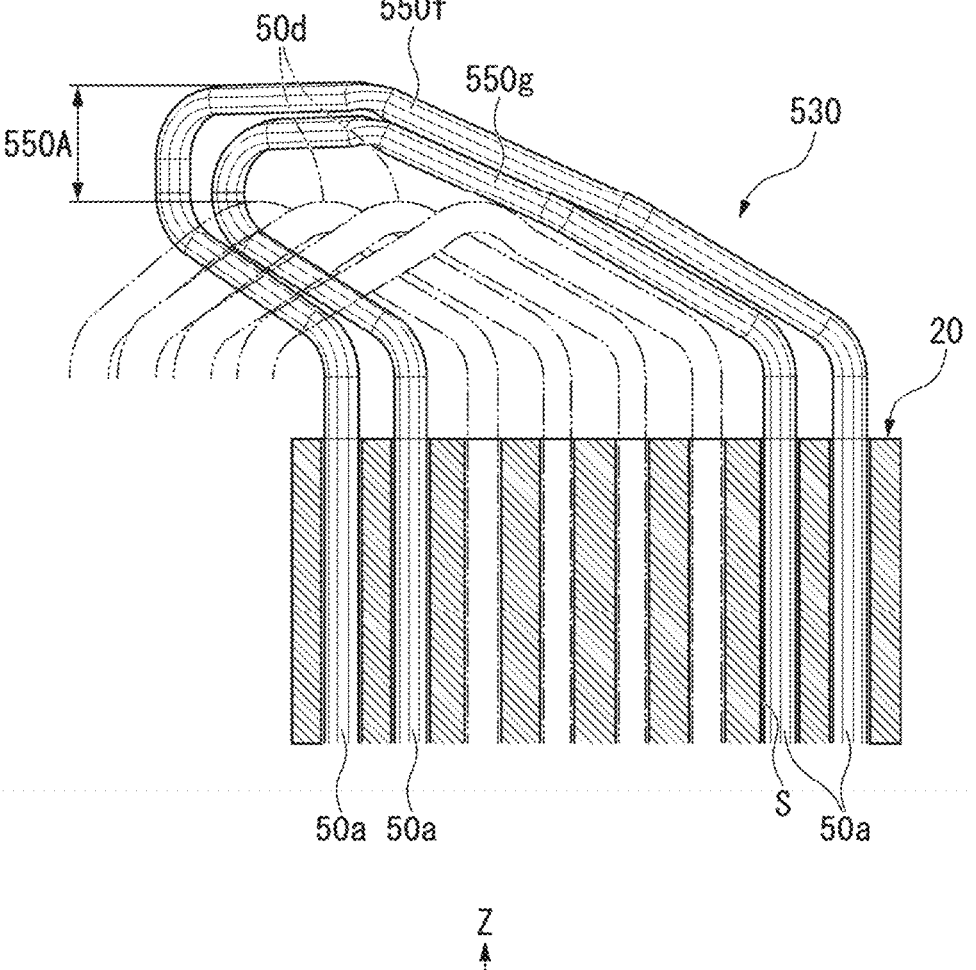
FIG. 11 is a schematic diagram illustrating a folded portion according to a comparative embodiment.

FIG. 11 is a schematic view illustrating a first folded portion 550f and a second folded portion 550g according to a comparative embodiment as a conventional structure.

A winding portion 530 of the comparative embodiment has the same winding configuration as that of the embodiment, but configurations of a first folded portion 550f and the second folded portion 550g are different. Each of the first folded portion 550f and the second folded portion 550g of the comparative embodiment extends upward from the straight portion 50a. The first folded portion 550f and the second folded portion 550g do not retract radially inside with respect to the crossing portion 50d. For this reason, the folded portions 550f, 550g of the comparative embodiment have a retracted region 550A protruding above the upper end of the crossing portion 50d and above the crossing portion 50d in order to prevent interference with the crossing portion 50d.

In addition, the folded portions 550f, 550g of the comparative embodiment extend along the inclination direction of the crossing portion 50d in the region below the retracted region 550A in order to prevent the interference with the crossing portion 50d. The crossing portion 50d is inclined to the other side θ2 in the circumferential direction toward the upper side. For this reason, the folded portions 550g, 550f have a hairpin shape that makes a U-turn from the other side θ2 in the circumferential direction to the one side θ1 in the circumferential direction in the retracted region 550A. As described above, the folded portions 550f, 550g of the comparative embodiment have a large protrusion height with respect to the crossing portion 50d of the retracted region 550A.

Figure 5:
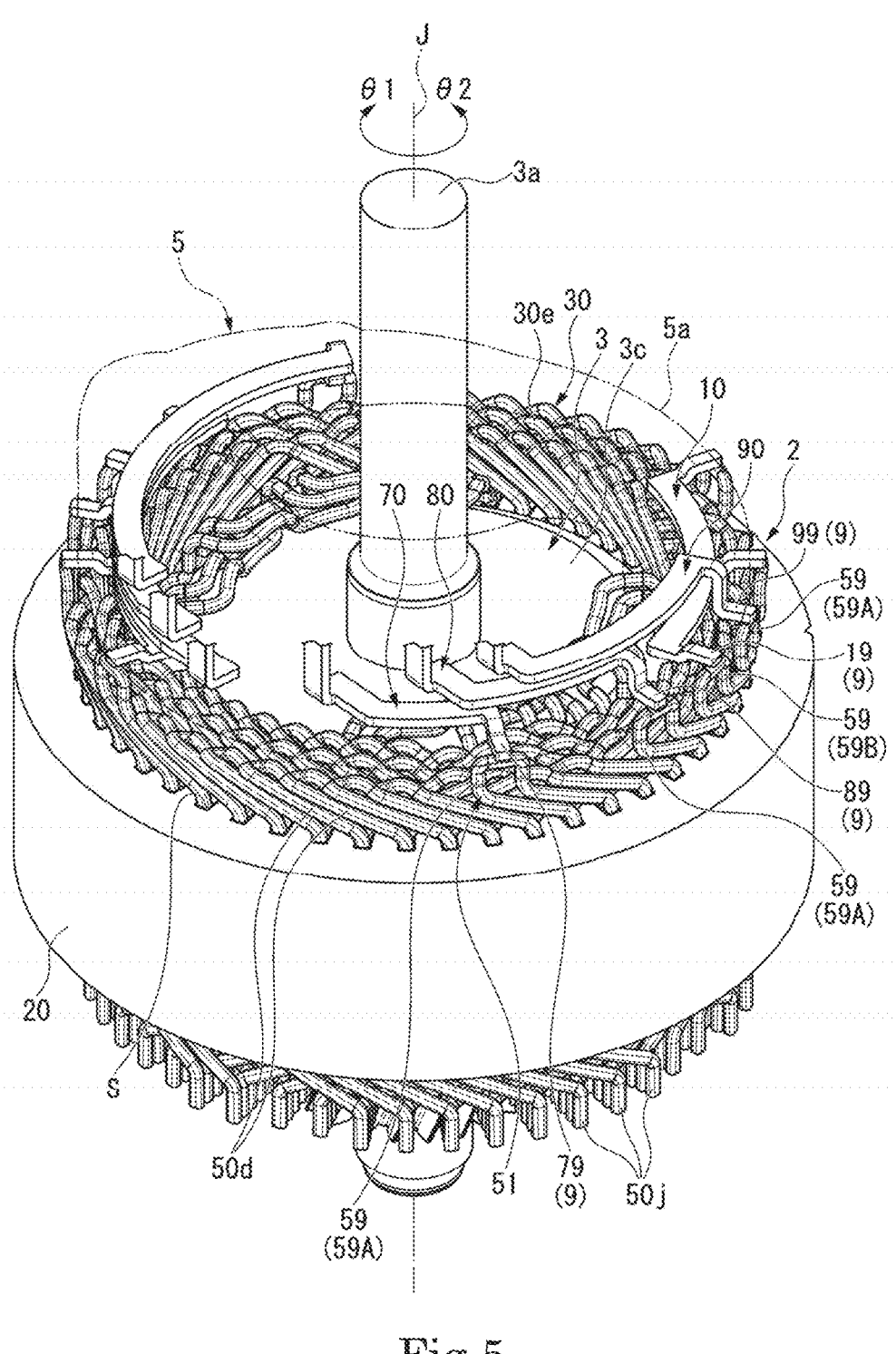
FIG. 5 is a perspective view illustrating a stator, a rotor, and the bus bar unit of the embodiment.
Figure 6:
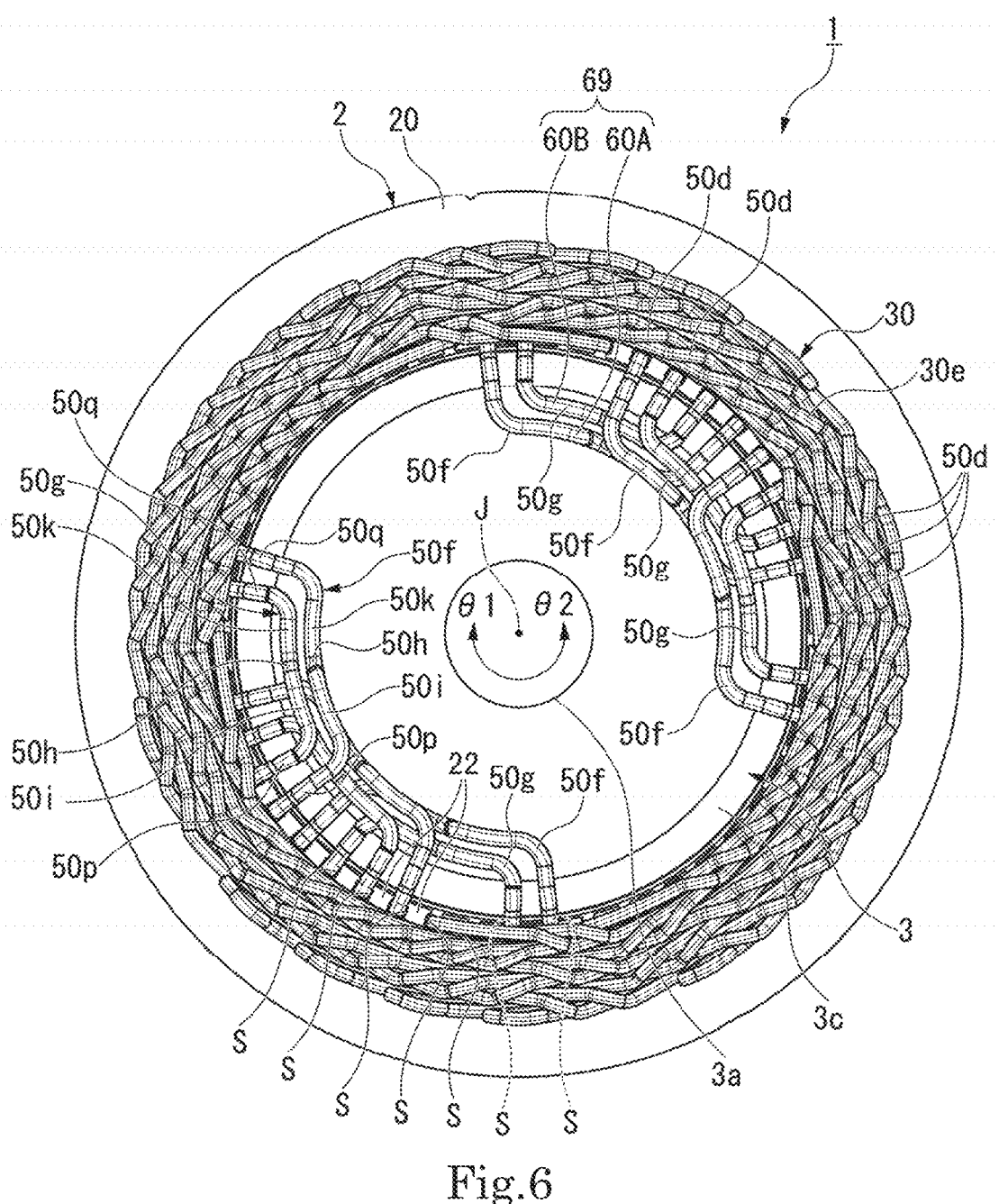
FIG. 6 is a plan view illustrating the stator and the rotor of the embodiment.

FIG. 5 is a perspective view illustrating the stator 2, the rotor 3, and the bus bar unit 5 of the embodiment. FIG. 6 is a plan view illustrating an example of the stator 2 and the rotor 3. FIG. 7 is a perspective view illustrating a part of the stator 2 and the rotor 3, and illustrates the first folded portion 50f and the second folded portion 50g of the embodiment.

In FIG. 5, a holding member 5a of the bus bar unit 5 is not illustrated.

As illustrated in FIG. 6, the folded portions 50f, 50g are located on one side in the axial direction of the stator core 20 and bend radially inside. Furthermore, at least a part of the folded portions 50f, 50g is located radially inside from an inside surface 20a of the stator core 20. For this reason, a part of the folded portions 50f, 50g is disposed so as to be overlapped with the rotor 3 when viewed from the axial direction. The inside surface 20a of the stator core 20 is an end face of the teeth 22 facing the radial inside.

According to the embodiment, the first folded portion 50f and the second folded portion 50g are bent radially inside to avoid the interference with other crossing portions 50d. Thus, the first folded portion 50f and the second folded portion 50g can be prevented from protruding in the axial direction with respect to other crossing portions 50d.

Furthermore, because the folded portions 50f, 50g of the embodiment retract radially inside with respect to the crossing portion 50d, the folded portions 50f, 50g do not pass between the crossing portions 50d. For this reason, according to the folded portions 50f, 50g of the embodiment, a hairpin shape is not required to be made unlike the folded portions 550f, 550g of the comparative embodiment. As a result, the folded portions 50f, 50g can be shortened, and the weight and efficiency of the stator 2 can be improved.

The first folded portion 50f straddles seven slots (the number of slots per pole s+1), and the second folded portion 50g straddles five slots S (the number of slots per pole s−1). Furthermore, two slots S from which the first folded portion 50f extends are arranged circumferentially outside with respect to two slots S from which the second folded portion 50g extends. The first folded portion 50f is disposed so as to straddle the second folded portion 50g from the radial inside and both sides in the circumferential direction.

That is, in the two in-phase conductor connection bodies 60 passing through the adjacent slots S, one (second conductor connection body 60B) extends between slots S separated by s−1 from each other at the folded portion 50g and the other (first conductor connection body 60A) extends between slots S separated by s+1 from each other at the folded portion 50f. Furthermore, the other (first conductor connection body 60A) passes through the radial inside of the folded portion 50g of one (second conductor connection body 60B) at the folded portion 50f. Thus, the first folded portion 50f and the second folded portion 50g can be prevented from increasing in size in the axial and radial directions while preventing mutual interference.

Figure 7:
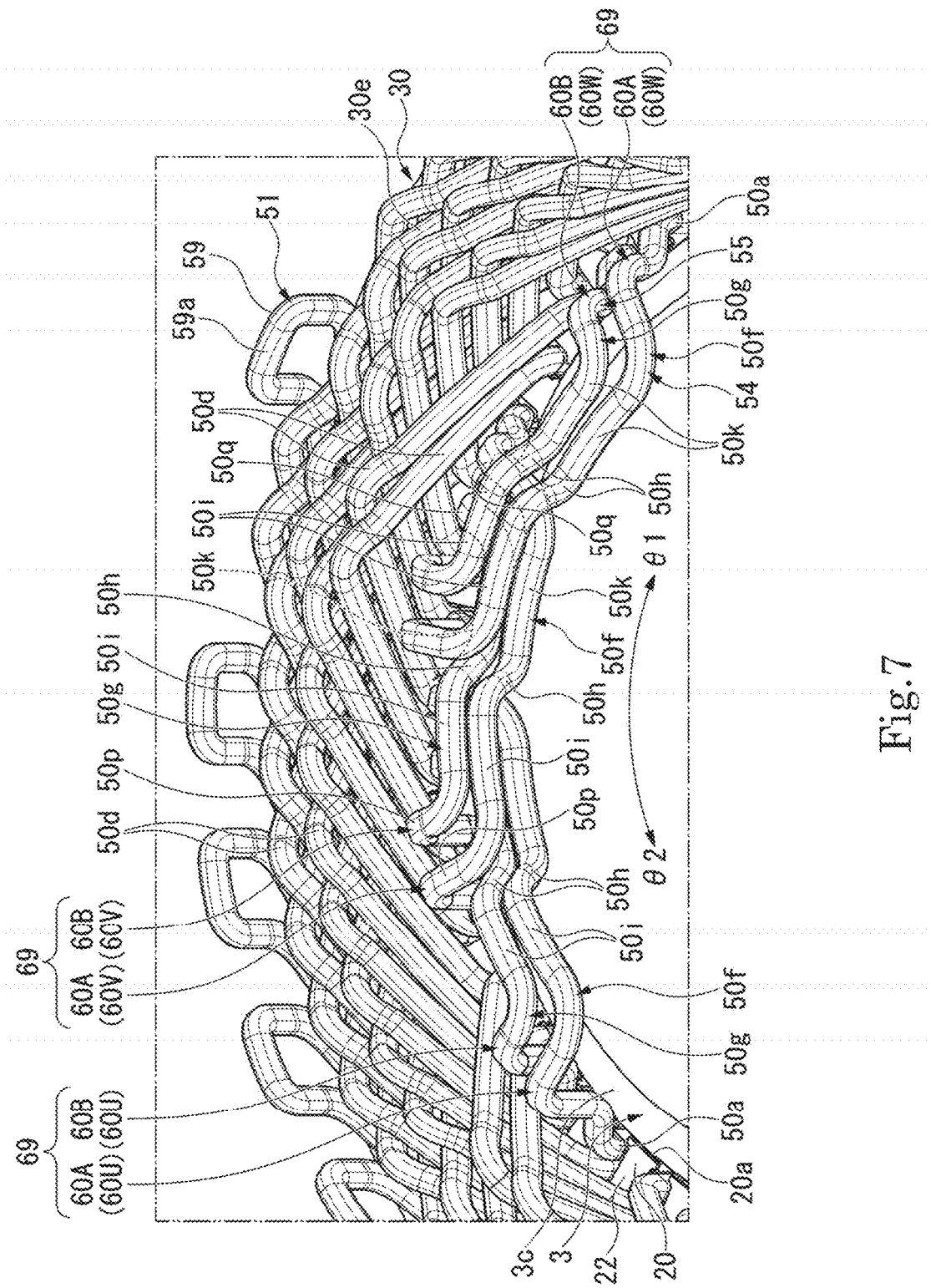
FIG. 7 is a perspective view illustrating a folded portion of the embodiment.

As illustrated in FIG. 7, the folded portions 50f, 50g include a first relay portion 50p, a first circumferential extension 50i, a step portion 50h, a second circumferential extension 50k, and a second relay portion 50q. The first relay portion 50p, the first circumferential extension 50i, the step portion 50h, the second circumferential extension 50k, and the second relay portion 50q are located in this order between the straight portion 50a located on the other side θ2 in the circumferential direction and the straight portion 50a located on one side θ1 in the circumferential direction in the folded conductors 54, 55.

The first circumferential extension 50i, the second circumferential extension 50k, and the step portion 50h are located radially inside from the inside surface 20a of the stator core 20. Accordingly, the first circumferential extension 50i, the second circumferential extension 50k, and the step portion 50h are disposed directly above the rotor 3.

The first relay portion 50p and the second relay portion 50q extend upward and radially inside from the slot S. The first relay portion 50p connects the straight portion 50a and the first circumferential extension 50i. Furthermore, the second relay portion 50q connects the straight portion 50a and the second circumferential extension 50k.

In this specification, "directly above" means that at least a part is overlapped when viewed from the upper side and the vertical direction.

The first circumferential extension 50i and the second circumferential extension 50k extend in an arcuate shape along the circumferential direction. The first circumferential extension 50i and the second circumferential extension 50k of the first folded portion 50f are disposed on the same circumference. Similarly, the first circumferential extension 50i and the second circumferential extension 50k of the second folded portion 50g are disposed on the same circumference. A diameter of the circumference where the circumferential extensions 50i, 50k of the first folded portion 50f are disposed is smaller than a diameter of the circumference where the circumferential extensions 50i, 50k of the second folded portion 50g are disposed. Accordingly, the circumferential extensions 50i, 50k of the first folded portion 50f pass through the radial inside of the circumferential extensions 50i, 50k of the second folded portion 50g.

The second circumferential extension 50k is located on one side θ1 in the circumferential direction with respect to the first circumferential extension 50i. The second circumferential extension 50k is located below the first circumferential extension 50i. That is, the second circumferential extension 50k extends in the circumferential direction on the lower side (the other side in the axial direction) than the first circumferential extension 50i.

The step portion 50h connects between the first circumferential extension 50i and the second circumferential extension 50k. The step portion 50h extends in the vertical direction (axial direction). The step portion 50h is connected to the end on one side in the circumferential direction of the first circumferential extension 50i at the upper end. The step portion 50h is connected to the end on the other side θ2 in the circumferential direction of the second circumferential extension 50k at the lower end. The first circumferential extension 50i, the step portion 50h, and the second circumferential extension 50k bend in a crank shape when viewed from the radial direction.

Two conductor connection bodies 60 passing through the adjacent slots S in the circumferential direction configure a connection body pair 69. Furthermore, the connection body pair 69 of another phase is disposed adjacent in the circumferential direction of the connection body pair 69 of one phase. That is, the connection body pairs 69 of different phases are disposed adjacent to each other in the circumferential direction. The folded portions 50f, 50g of the conductor connection bodies 60 of different phases are disposed adjacent to each other in the circumferential direction. In the embodiment, the U-phase connection body pair 69, the V-phase connection body pair 69, and the W-phase connection body pair 69 are disposed in this order toward one side θ1 in the circumferential direction.

The folded portions 50f, 50g of different phases disposed adjacent to each other in the circumferential direction are disposed so as to be partially overlapped each other in the axial direction. The first circumferential extension 50i of the V-phase conductor connection body 60V passes directly above the second circumferential extension 50k of the U-phase conductor connection body 60U. Similarly, the first circumferential extension 50i of the W-phase conductor connection body 60W passes directly above the second circumferential extension 50k of the V-phase conductor connection body 60V. In this way, the first circumferential extensions 50i of the folded portion 50g, 50g of one phase are axially overlapped with the second circumferential extensions 50k of the folded portion 50g, 50f of the other phase.

According to the embodiment, the folded portions 50f, 50g of different phases are overlapped each other in the axial direction. For this reason, the folded portions 50f, 50g of different phases in the circumferential direction are arranged in the circumferential direction while an insulation distance can be maintained from each other.

In the embodiment, the upper end of the first circumferential extension 50i disposed on the upper side is disposed below the upper end of the crossing portion 50d. For this reason, even when the folded portions 50f, 50g are laminated in the axial direction, the folded portions 50f, 50g can be prevented from protruding toward the upper side with respect to the coil end 30e.

According to the embodiment, the folded portions 50f, 50g of each phase include the first circumferential extension 50i and the second circumferential extension 50k. For this reason, the folded portions 50f, 50g of different phases adjacent to each other in the circumferential direction can be disposed so as to be overlapped in the axial direction, and the folded portions 50f, 50g of each phase can have the same shape. That is, parts having the same shape can be used as the folded conductors 54, 55 of each phase, and an increase in the number of parts configuring the winding portion 30 can be suppressed. Thus, the stator 2 can be manufactured at low cost.

The bent portion 59 of the embodiment will be described in detail below.

The bent portion 59 is provided so as to straddle the first conductor connection body 60A and the second conductor connection body 60B. The bent portion 59 connects the first conductor connection body 60A and the second conductor connection body 60B in parallel. In addition, the first bent portion 59A is connected to the phase bus bars 70, 80, 90, and the second bent portion 59B is connected to the neutral point bus bar 10.

Figure 8:
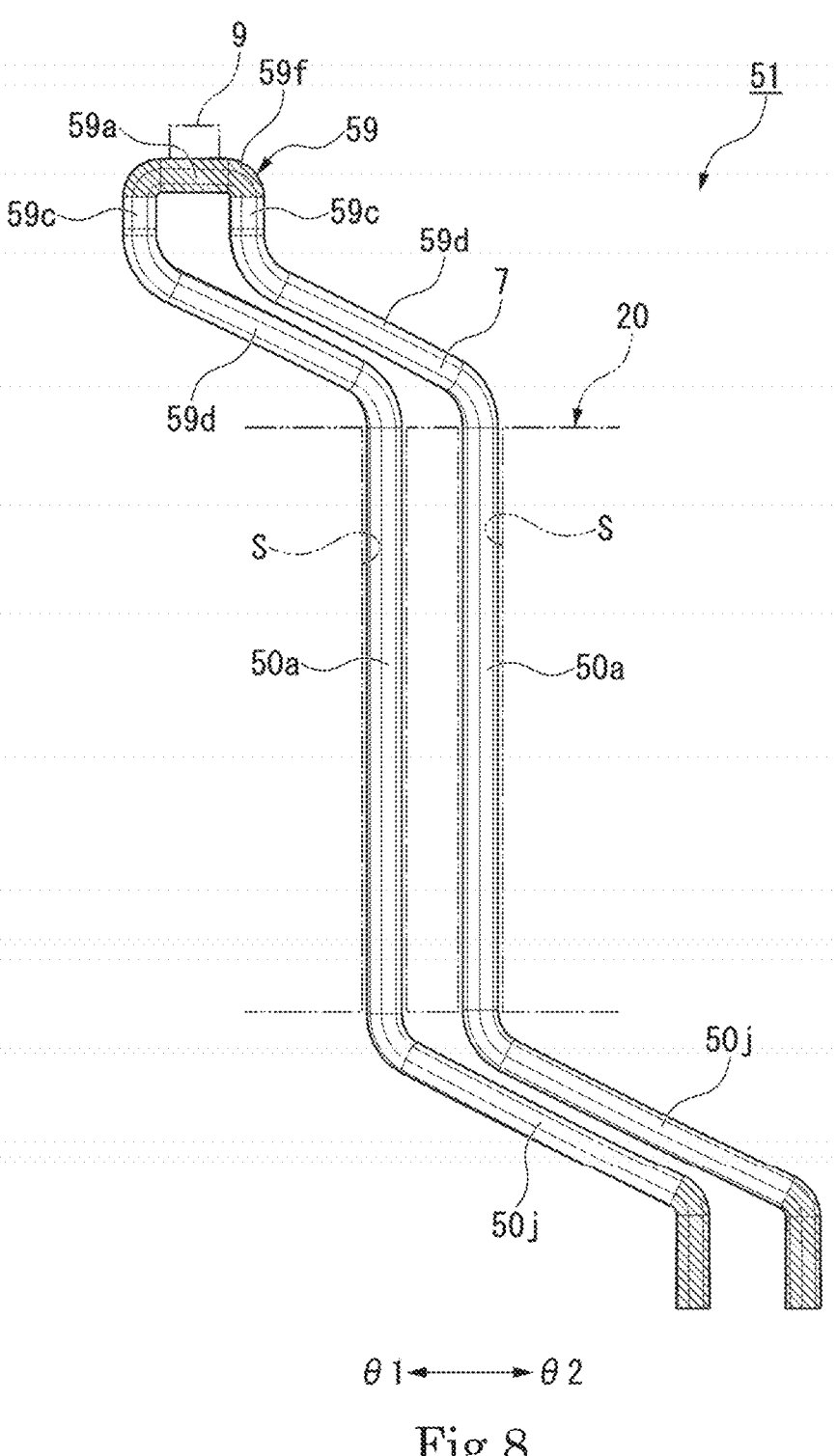
FIG. 8 is a front view illustrating a terminal conductor of the embodiment when viewed from a radial outside.

FIG. 8 is a front view illustrating the terminal conductor 51 when viewed from the radial outside.

As illustrated in FIG. 8, the bent portion 59 includes two inclination portions 59d, two axial extensions 59c, and one flat portion 59a.

The inclination portion 59d is connected to the upper end of the straight portion 50a. The inclination portion 59d is inclined to one side (θ1) in the circumferential direction toward the upper side. The inclination angles of the two inclination portions 59d are the same. That is, the two inclination portions 59d extend in parallel.

The two axial extensions 59c and one flat portion 59a form a U-shape that opens downward. The axial extension 59c extends upward from the upper end of the inclination portion 59d. That is, the axial extension 59c extends in the axial direction.

The flat portion 59a is located at the upper end (the end on one side in the axial direction) of the bent portion 59. That is, the bent portion 59 includes the flat portion 59a at the upper end. The flat portion 59a connects the upper ends of the axial extensions 59c to each other. The flat portion 59a extends linearly between the upper ends of the axial extensions 59c. That is, the flat portion 59a extends along a plane orthogonal to the axial direction.

The bent portion 59 is connected to the terminal portion 9 at the flat portion 59a. At this point, the terminal portion 9 is any one of the terminal portion 19, 79, 89, 99 of the neutral point bus bar 10 and the phase bus bar 70, 80, 90. Accordingly, the terminal conductor 51 is connected to the neutral point bus bar 10 and the phase bus bars 70, 80, 90 at the bent portion 59.

The terminal portion 9 is located above the flat portion 59a. The flat portion 59a and the terminal portion 9 are connected to each other by joining means such as welding. When being joined by resistance welding, the current passes through the flat portion 59a and the terminal portion 9 while the flat portion 59a and the terminal portion 9 are sandwiched from above and below by electrodes, thereby welding the flat portion 59a and the terminal portion 9.

According to the embodiment, both ends of the bent portion 59 are connected to the straight portion 50a passing through the slot S. Because both ends of the bent portion 59 are supported, the bent portion 59 has high rigidity. Therefore, even when vibration is applied to the bent portion 59, the bent portion 59 hardly resonates, and stress applied to the connection portion of the bent portion 59 and the terminal portion 9 can be reduced. Accordingly, according to the embodiment, the connection portion of the bent portion 59 and the terminal portion 9 is hardly damaged.

According to the embodiment, the bent portion 59 connects two conductor connection bodies 60 to each other in parallel at both ends. For this reason, the bent portion 59 is connected to one terminal portion 9, so that two conductor connection bodies 60 can be connected to the bus bar at the same time. According to the embodiment, the number of connection points of the conductor connection body 60 and the bus bar can be reduced, and the connection process can be simplified.

According to the embodiment, the bent portion 59 is connected to the terminal portion 9 at the flat portion 59a extending along a plane orthogonal to the axial direction. For this reason, the connection portion of the conductor connection body 60 and the terminal portion 9 does not extend upward with respect to the terminal portion 9, so that the axial dimension of the stator 2 can be reduced. Furthermore, the flat portion 59a is provided in the bent portion 59, so that a wide contact area can be secured in the connection portion of the bent portion 59 and the terminal portion 9, and the stable connection can be implemented.

As described above, the surface of the terminal conductor 51 is covered with an enamel coating (coating) 7 that is an insulating coating. An exposed portion 59f from which the enamel coating 7 is removed to expose the surface is provided in the terminal conductor 51. The flat portion 59a is located at the exposed portion 59f. According to the embodiment, the surface of the terminal conductor 51 is exposed from the enamel coating 7 at the flat portion 59a. For this reason, the electric connection between the flat portion 59a and the terminal portion 9 can be stably performed. After the flat portion 59a and the terminal portion 9 are connected by connecting means such as welding, a covering portion may be further provided on the connection portion. In this case, for example, the covering portion is formed by powder coating.

Figure 9:
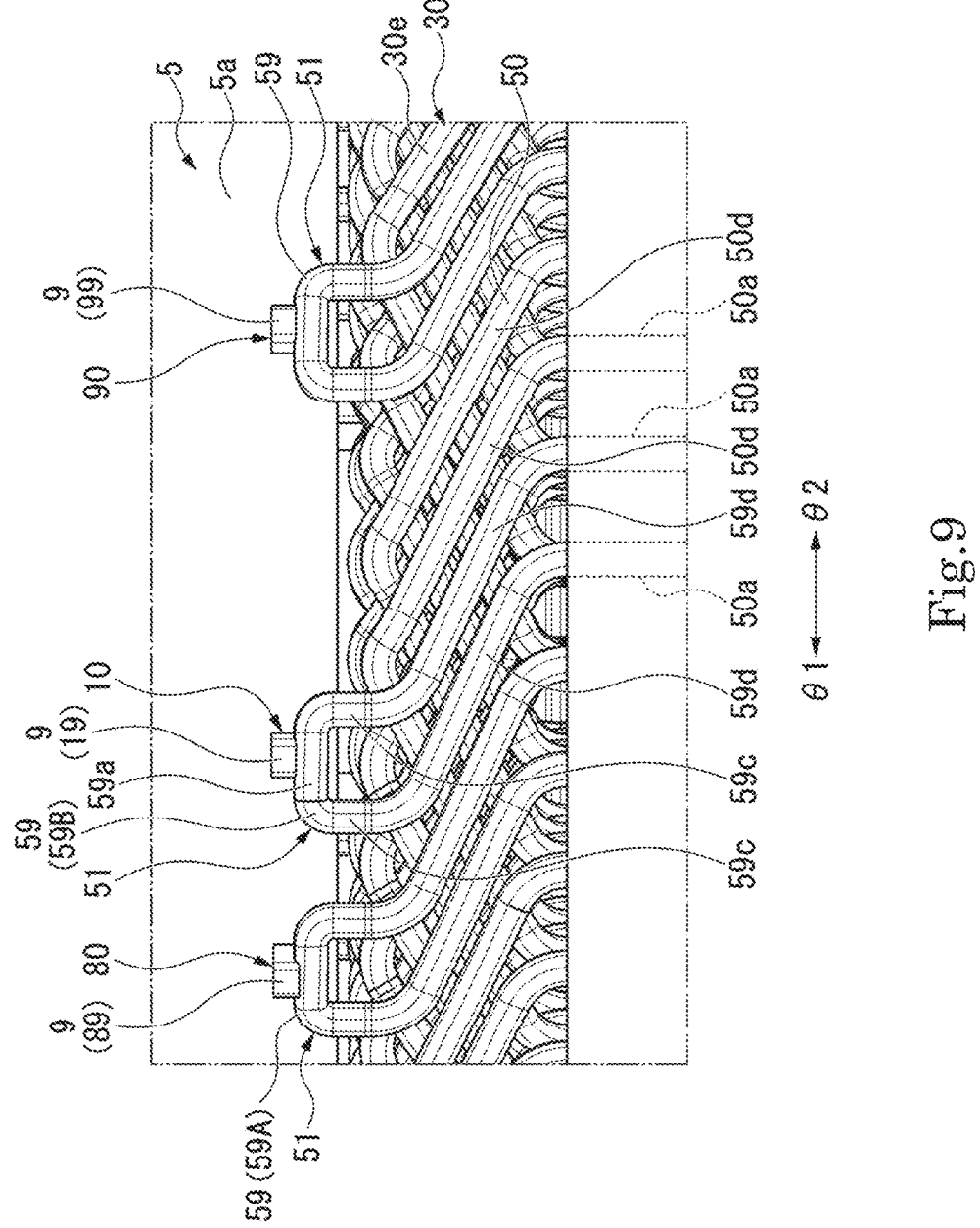
FIG. 9 is a partially side view illustrating the motor of the embodiment.

FIG. 9 is a partially side view illustrating the motor 1 of the embodiment, and is an enlarged view illustrating the connection portion between the bent portion 59 and the terminal portion 9 when viewed from the radial outside.

As illustrated in FIG. 9, the bent portion 59 is located on the outermost circumference of the coil end 30e. Furthermore, the bent portion 59 protrudes upward (one side in the axial direction) from the crossing portion 50d of another conductor 50. On the other hand, the terminal portion 9 protrudes radially outside from the outer circumferential surface of the holding member 5a of the bus bar unit 5. The connection point between the bent portion 59 and the terminal portion 9 is disposed along the outer circumferential surface of the bus bar unit 5. Thus, the connection process of the bent portion 59 and the terminal portion 9 can be performed from the radial outside of the motor 1, and the connection process can be simplified.

As illustrated in FIG. 9, the bent portion 59 is disposed between the crossing portions 50d. The inclination portion 59d of the bent portion 59 is inclined on one side θ1 in the circumferential direction from the upper end of the straight portion 50a toward the upper side. Similar to the inclination portion 59d, the crossing portion 50d adjacent to the bent portion 59 is inclined on one side θ1 in the circumferential direction from the upper end of the straight portion 50a toward the upper side. That is, an inclination direction of the inclination portion 59d is matched with an inclination direction of the crossing portion 50d. As a result, the interference between the bent portion 59 and the crossing portion 50d is prevented, and the bent portion 59 does not require to retract radially outside with respect to the crossing portion 50d. As a result, the bent portion 59 can be prevented from protruding radially outside at the coil end 30e.

As illustrated in FIG. 5, the bus bar unit 5 is disposed above the stator 2. More specifically, the bus bar unit 5 is disposed directly above the coil end 30e.

Figure 10:
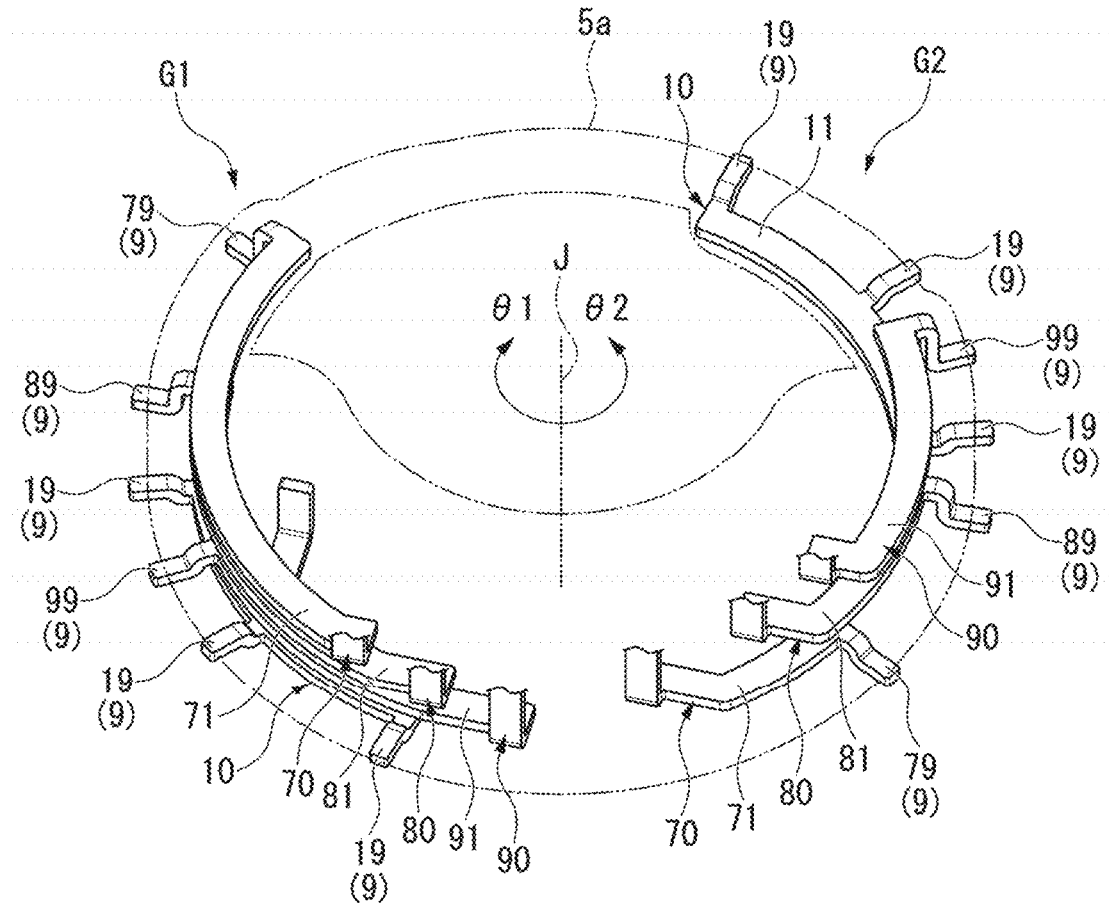
FIG. 10 is a perspective view illustrating the bus bar unit of the embodiment.

FIG. 10 is a perspective view of the bus bar unit 5. In FIG. 10, the illustration of the holding member 5a is omitted.

The bus bar unit 5 is an annular ring shape centered on the center axis line J. The bus bar unit 5 includes two U-phase bus bars 70, two V-phase bus bars 80, two W-phase bus bars 90, two neutral point bus bars 10, and the holding member 5a. The phase bus bars 70, 80, 90 and the neutral point bus bar 10 are plate-shaped and formed by press working.

The bus bar unit 5 can be regarded as a part of the stator 2. In this case, the stator 2 includes a plurality of bus bars 10, 70, 80, 90 and a holding member 5a. The plurality of bus bars 10, 70, 80, 90 and the holding member 5a are disposed on the upper side (one side in the axial direction) of the stator 2.

The plurality of bus bars are divided into a first group G1 and a second group G2 each of which includes the U-phase bus bar 70, the V-phase bus bar 80, the W-phase bus bar 90, and the neutral point bus bar 10. The bus bars of the first group G1 and the second group G2 are disposed on opposite sides in the circumferential direction with the center axis line J interposed therebetween.

Each of the phase bus bars 70, 80, 90 includes one main body portion 71, 81, 91, one terminal portion 79, 89, 99, and one input terminal unit (not illustrated). Similarly, each of the two neutral point bus bars 10 includes one main body portion 11 and three terminal portions 19. The input terminal unit is connected to an inverter (not illustrated) through another bus bar (not illustrated) prepared separately.

The main body portions 11, 71, 81, 91 are located directly above the coil end 30e. That is, the main body portions 11, 71, 81, 91 are located on the upper side of the coil end 30e. The main body portions 11, 71, 81, 91 are disposed with the axial direction as a plate thickness direction. Each of the main body portions 11, 71, 81, 91 extends in an arcuate shape along the circumferential direction. In the first group G1 or the second group G2, the main body portions 11, 71, 81, 91 of the neutral point bus bar 10 and the phase bus bars 70, 80, 90 are laminated in the axial direction. That is, the main body portions 11, 71, 81, 91 of the plurality of bus bars 10, 70, 80, 90 overlap each other in the axial direction.

The terminal portions 19, 79, 89, 99 (or simply terminal portion 9 when not distinguished) extend radially outside from outer edges of the main body portions 11, 71, 81, 91. The terminal portions 79, 89, 99 of the phase bus bars 70, 80, 90 are connected to the first bent portion 59A of the winding portion 30. Furthermore, the terminal portion 19 of the neutral point bus bar 10 is connected to the second bent portion 59B of the winding portion 30. The heights of the tips of all the terminal portions 9 are matched with as each other. Because the terminal portions 9 extend from the main body portions 11, 71, 81, 91 having different heights, the terminal portions 9 are bent in a crank shape such that the heights of the tips of the terminal portions 9 are matched with each other.

In the first group G1 and the second group G2, the terminal portions 9 are disposed rotationally symmetrically centered on the center axis line J. More specifically, the U-phase terminal portion 79 of the first group G1 and the U-phase terminal portion 79 of the second group G2 are disposed on opposite sides in the circumferential direction with the center axis line J interposed therebetween. The V-phase terminal portion 89 of the first group G1 and the V-phase terminal portion 89 of the second group G2 are disposed on opposite sides in the circumferential direction with the center axis line J interposed therebetween. The W-phase terminal portion 99 of the first group G1 and the W-phase terminal portion 99 of the second group G2 are disposed on opposite sides in the circumferential direction with the center axis line J interposed therebetween. Furthermore, the three neutral point terminal portions 19 of the first group G1 and the three neutral point terminal portions 19 of the second group G2 are disposed on opposite sides with the center axis line J interposed therebetween.

The holding member 5a is made of an insulating resin member. The holding member 5a is molded by insert molding in which a part of the neutral point bus bar 10 and the phase bus bars 70, 80, 90 is embedded. As a result, the holding member 5a holds all the neutral point bus bars 10 and the phase bus bars 70, 80, 90.

The holding member 5a has an annular ring shape centered on the center axis line J. In the holding member 5a, the main body portions 11, 71, 81, 91 are embedded, and the terminal portion 9 and the input terminal portion (not illustrated) are exposed. That is, in the main body portions 11, 71, 81, 91, the plurality of bus bars 10, 70, 80, 90 are embedded in the holding member 5a. Furthermore, all the terminal portions 9 project radially outward from the outer circumferential surface of the holding member 5a.

The resin material of the holding member 5a is inserted between the main body portions 11, 71, 81, 91. That is, the insulating resin member is interposed between the main body portions 11, 71, 81, 91 laminated in the axial direction. Thus, even when the main body portions 11, 71, 81, 91 are disposed close to each other, the insulation between the main body portions 11, 71, 81, 91 can be ensured.

Although the embodiment of the present invention is described above, structures in the embodiment are examples, and thus addition, elimination, replacement of structure, and other modifications can be made within a range without departing from the spirit of the present invention. Also note that the present invention is not limited by the embodiment.

For example, in the embodiment, the case where the motor 1 is the three-phase motor has been described. However, the motor 1 may be another motor such as a five-phase motor.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator disposed radially outside a rotor rotatable about a center axis line, the stator comprising:
   a winding portion including a plurality of conductor connection bodies in which a plurality of conductors are connected in series, wherein the plurality of conductor connection bodies includes a set of conductor connection bodies which is less than all of the plurality of conductor connection bodies; and
   a stator core in which a plurality of slots through which the plurality of conductor connection bodies passes are provided,
   wherein each of the set of conductor connection bodies includes:
      a first portion wave-wound on an other side in a circumferential direction;
      a folded portion connected to an end on the other side in the circumferential direction of the first portion; and
   a second portion wave-wound on one side in the circumferential direction from the folded portion,
   the folded portion is located on one side in an axial direction of the stator core and bent radially inside,
   at least a part of the folded portion is located radially inside from an inside surface of the stator core, and
   the winding portion includes the set of conductor connection bodies extending in a continuous arc for less than an entirety of a full circumference of the winding portion,
   wherein the folded portions of different phases overlap each other in the axial direction, and the folded portion includes:
      a first circumferential extension extending along the circumferential direction;

a second circumferential extension extending along the circumferential direction on an other side of the axial direction from the first circumferential extension; and a step portion connecting the first circumferential extension and the second circumferential extension, and the first circumferential extension of the folded portion of one phase is axially overlapped with the second circumferential extension of the folded portion of another phase.

2. The stator according to claim 1, wherein each of a plurality of phases includes the plurality of the conductor connection bodies, and the conductor connection bodies of each phase are connected in parallel.

3. The stator according to claim 1, wherein the plurality of conductor connection bodies are Y-connected, each of the first portion and the second portion includes:

a plurality of straight portions that extend along the axial direction and are located in the slot; and a crossing portion connecting the straight portions to each other on one side in the axial direction of the stator core, and the conductor connection body extends between the slots separated by s that is a number of slots per pole in the crossing portion.

4. A motor comprising:

the stator according to claim 1; and the rotor.

5. A stator disposed radially outside a rotor rotatable about a center axis line, the stator comprising:

a winding portion including a plurality of conductor connection bodies in which a plurality of conductors are connected in series, wherein the plurality of conductor connection bodies includes a set of conductor connection bodies which is less than all of the plurality of conductor connection bodies; and a stator core in which a plurality of slots through which the plurality of conductor connection bodies passes are provided, wherein each of the set of conductor connection bodies includes:

a first portion wave-wound on the other side in a circumferential direction;

a folded portion connected to an end on an other side in the circumferential direction of the first portion; and a second portion wave-wound on one side in the circumferential direction from the folded portion, the folded portion is located on one side in an axial direction of the stator core and bent radially inside, at least a part of the folded portion is located radially inside from an inside surface of the stator core, and the winding portion includes the set of conductor connection bodies extending in a continuous arc for less than an entirety of a full circumference of the winding portion, wherein the plurality of conductor connectors are Y-connected, each of the first portion and the second portion includes:

a plurality of straight portions that extend along the axial direction and are located in the slot; and a crossing portion connecting the straight portions to each other on one side in the axial direction of the stator core, and the conductor connection body extends between the slots separated by s that is a number of slots per pole in the crossing portion, wherein in two in-phase conductor connection bodies passing through the adjacent slots, one of the conductor connection bodies extends between the slots separated by s+1 at the folded portion, and the other extends between the slots separated by s+1 at the folded portion and passes through the radial inside of the folded portion of the one of the conductor connection bodies.

6. The stator according to claim 5, wherein in the two in-phase conductor connection bodies passing through the adjacent slots, the folded portion of one of the conductor connection bodies passes the radial outside of the folded portion of the other of the conductor connection bodies.

7. A motor comprising:

the stator according to claim 5; and the rotor.

8. A stator disposed radially outside a rotor rotatable about a center axis line, the stator comprising:

a winding portion including a plurality of conductor connection bodies in which a plurality of conductors are connected in series; and a stator core in which a plurality of slots through which the conductor connection body passes are provided, wherein the conductor connection body includes:

a first portion wave-wound on an other side in a circumferential direction;

a folded portion connected to an end on the other side in the circumferential direction of the first portion; and a second portion wave-wound on one side in the circumferential direction from the folded portion, the folded portion is located on one side in an axial direction of the stator core and bent radially inside, and at least a part of the folded portion is located radially inside from an inside surface of the stator core wherein the plurality of conductor connection bodies are 4Y-connected.

9. A motor comprising:

the stator according to claim 8; and the rotor.

10. A stator disposed radially outside a rotor rotatable about a center axis line, the stator comprising:

a winding portion including a plurality of conductor connection bodies in which a plurality of conductors are connected in series, wherein the plurality of conductor connection bodies includes a set of conductor connection bodies which is less than all of the plurality of conductor connection bodies; and a stator core in which a plurality of slots through which the plurality of conductor connection bodies passes are provided, wherein each of the set of conductor connection bodies includes:

a first portion wave-wound on an other side in a circumferential direction;

a folded portion connected to an end on the other side in the circumferential direction of the first portion; and a second portion wave-wound on one side in the circumferential direction from the folded portion, the folded portion is located on one side in an axial direction of the stator core and bent radially inside, at least a part of the folded portion is located radially inside from an inside surface of the stator core, and the winding portion includes the set of conductor connection bodies extending in a continuous arc for less than an entirety of a full circumference of the winding portion;

a plurality of bus bars, wherein the plurality of bus bars is divided into a first group and a second group, each of the first group and the second group includes a plurality of phase bus bars and a neutral point bus bar, and bus bars of the first group are disposed on an opposite side, in the circumferential direction, from bus bars of the second group with the center axis line therebetween.

11. The stator according to claim 10, wherein the folded portions of different phases overlap each other in the axial direction.

12. The stator according to claim 11, wherein the folded portion includes:

a first circumferential extension extending along the circumferential direction;

a second circumferential extension extending along the circumferential direction on an other side of the axial direction from the first circumferential extension; and a step portion connecting the first circumferential extension and the second circumferential extension, and the first circumferential extension of the folded portion of one phase is axially overlapped with the second circumferential extension of the folded portion of another phase.

13. The stator according to claim 10, wherein a gap between the first group and the second group is offset with respect to the set of conductor connection bodies.

14. A motor comprising:

the stator according to claim 10; and the rotor.

* * * * *